United States Patent [19]

Mabuchi

[11] Patent Number: 5,257,058
[45] Date of Patent: Oct. 26, 1993

[54] INTERCHANGEABLE LENS SYSTEM

[75] Inventor: Toshiaki Mabuchi, Tama, Japan

[73] Assignee: Canon Kabushiki Kaisha, Tokyo, Japan

[21] Appl. No.: 7,363

[22] Filed: Jan. 21, 1993

Related U.S. Application Data

[63] Continuation of Ser. No. 800,573, Nov. 27, 1991, abandoned.

[30] Foreign Application Priority Data

Nov. 30, 1990 [JP] Japan .................................. 2-333836
Nov. 30, 1990 [JP] Japan .................................. 2-333837

[51] Int. Cl.$^5$ ............................................. G03B 17/00
[52] U.S. Cl. .................................................. 354/286
[58] Field of Search ..................... 354/286, 289.12, 484

[56] References Cited

U.S. PATENT DOCUMENTS 5,068,680 11/1991 Kawasaki et al. ................. 354/286

Primary Examiner—Michael L. Gellner
Assistant Examiner—Howard B. Blankenship
Attorney, Agent, or Firm—Robin, Blecker, Daley & Driscoll

[57] ABSTRACT

An interchangeable lens system comprising a lens unit; a camera body provided with a first electric power supplying battery; a conversion adapter for connecting the camera body with the lens unit, thereby enabling electric power supply from the battery in the camera body to the lens unit; a second electric power supplying battery connected to the conversion adapter and controllable independently from the first battery; and a control circuit for enabling electric power supply from the second battery to the lens unit only when the camera body is connected to the conversion adapter.

17 Claims, 3 Drawing Sheets

INTERCHANGEABLE LENS SYSTEM

This is a continuation application under 37 CFR 1.62 of prior application Ser. No. 800,573, filed Nov. 27, 1991, now abandoned.

BACKGROUND OF THE INVENTION

1. Field of the Invention

The present invention relates to a power supply system adapted for use in an imaging equipment such as a video camera system, with an interchangeable lens.

2. Related Background Art

Imaging equipment including video camera systems has shown remarkable progress in recent years, and, for improving the performance particularly in video cameras and camcorders, there have been proposed interchangeable lens systems capable of using various lenses.

In the field of interchangeable lens systems, those for single lens reflex cameras (lens systems for still cameras) are already well known, and various lenses including special ones for specific purposes are already made commercially available.

However the video camera systems are still in the introductory period, and the market therefor is still undeveloped, so that the manufacture of many special lenses featuring the interchangeable lens system is unpractical in such initial stage. On the other hand, it will be very convenient for the users if the commercially available interchangeable lenses for the single lens reflex cameras can be used on the video cameras. Thus, with the recent spreading of video cameras, there is an increasing desire for using the interchangeable lenses for single-lens reflex cameras also for the video cameras.

For this purpose, there is required a conversion adapter for connecting the lenses for still camera with the video camera.

Such conversion adapter is required:

(1) for matching between the lens mount in the interchangeable lens system of the video camera with that of the lens system of the still camera;

(2) for compensating the difference in the optical path length from the lens mount to the image plane, between the video camera and the still camera; and (3) for matching the communication format, data format and/or control protocol in the control data transfer, between the interchangeable lens system for the video camera and that for the still camera.

In general, in the interchangeable lens system for the video camera, the electric power to the lens is supplied from a battery or an AC adapter connected to the video camera, through electrical contacts provided on the lens mount.

Since the video camera generally includes a driving circuit which requires a large electric power in continuous manner, such as a motor, the electric power supplied to the lens is often subjected to a certain limitation, in consideration of the usable time of the battery.

On the other hand, in the still camera system, the limitation on the electric power is relatively not strict, because the driving circuit requiring a large electric power, such as a motor, is not used in continuous manner.

As a result, in case the lens for still camera is connected to the video camera, the electric power required by said lens may exceed the maximum electric power supply of the video camera.

For filling such deficiency in electric power supply, it is conceivable to provide the conversion adapter with another electric power supply source such as an external battery.

Such configuration functions normally when the conversion adapter is connected to the video camera, but results, firstly, in a drawback that the electric power from said supply source is supplied to and wasted in the lens, in case said conversion adapter is not connected to the video camera but only to the lens. The battery will become completely discharged and unusable if the system is left in this state.

Secondly, such external battery has to be compact and light, because it is connected to the conversion adapter and used in combination with the video camera, the conversion adapter and the lens for still camera when the system is actually used by the user. For this reason, there is required a compact primary battery as ordinarily employed in the still camera systems, such as a lithium battery. In the use of such primary battery, the power consumption has to be controlled more strictly than in ordinary systems, since the battery is not re-usable.

SUMMARY OF THE INVENTION

The present invention is to resolve the above-mentioned drawbacks in the prior art, and an object of the present invention is to provide a system which is capable, even in case of mounting a lens unit of a large electric power consumption on the camera, of electric power supply by an external power source through an intermediate adapter, thereby dispensing with the necessity of incorporating a lower power source in the camera, and also capable of terminating the power supply from said external power source in case the camera is not connected to said adapter, thereby avoiding the waste of power of said external power source in case the camera remains unconnected.

The above-mentioned object can be attained, according to a preferred embodiment of the present invention, by an interchangeable lens system comprising a lens unit; a camera body provided with first electric power supply means; a conversion adapter adapted for connecting said camera body with said lens unit and for enabling electric power supply from the electric power supply means in said camera body to said lens unit; second electric power supply means connected to said conversion adapter and being controllable independently from said first electric power supply means in said camera body; and control means enabling electric power supply from said second electric power supply means to said lens unit only when said camera body is connected to said conversion adapter.

Also according to another preferred embodiment of the present invention, there is provided a conversion adapter for connecting a first control device including first electric power supply means with a second control device receiving the electric power supply and for enabling electric power supply from said electric power supply means to said second control device, wherein said conversion adapter is rendered connectable with second electric power supply means which is controllable independently from said first control device, and said conversion adapter comprises control means for enabling electric power supply from said second electric power supply means to said second control device only when said first control device is connected to said conversion adapter.

Another object of the present invention is to provide an interchangeable lens system which, even in case of mounting a lens unit involving a driving system of a large electric power consumption, avoids the necessity of incorporating a large electric power source in the camera body, by power supply from the camera body only to a control system of said lens unit and by power supply from an external power source to said drive system through an intermediate adapter, thereby enabling efficient battery control.

The above-mentioned object can be attained, according to a preferred embodiment of the present invention, by an interchangeable lens system consisting of a lens unit including a drive system and a control system for controlling said drive system; a camera body including first electric power supply means; and a conversion adapter to be connected between said camera body and said lens unit, comprising:

second electric power supply means connected to said conversion adapter and controllable independently from said first electric power supply means in said camera body; and electric power source control means so constructed as to supply the control system of said lens unit with electric power from the first electric power supply means in said camera body and to supply the drive system of said lens unit with electric power from said second electric power supply means.

Also according to another preferred embodiment of the present invention, there is provided a conversion adapter for connecting a first control device including first electric power supply means with a second control device including a drive system and a control system for controlling said drive system, wherein said conversion adapter is rendered connectable to second electric power control means controllable independently from said first control device and comprising electric power control means adapted for effecting control in such a manner as to provide the control system of said second control device with electric power supply from the first electric power supply means in said first control device and to provide the drive system of said second control device with electric power supply from said second electric power supply means.

Still other objects of the present invention, and the advantages thereof, will become fully apparent from the following description which is to be taken in conjunction with the attached drawings.

DETAILED DESCRIPTION OF THE PREFERRED EMBODIMENTS

Now the interchangeable lens system of the present invention will be clarified in detail by an embodiment thereof shown in the attached drawings.

Figure 1:
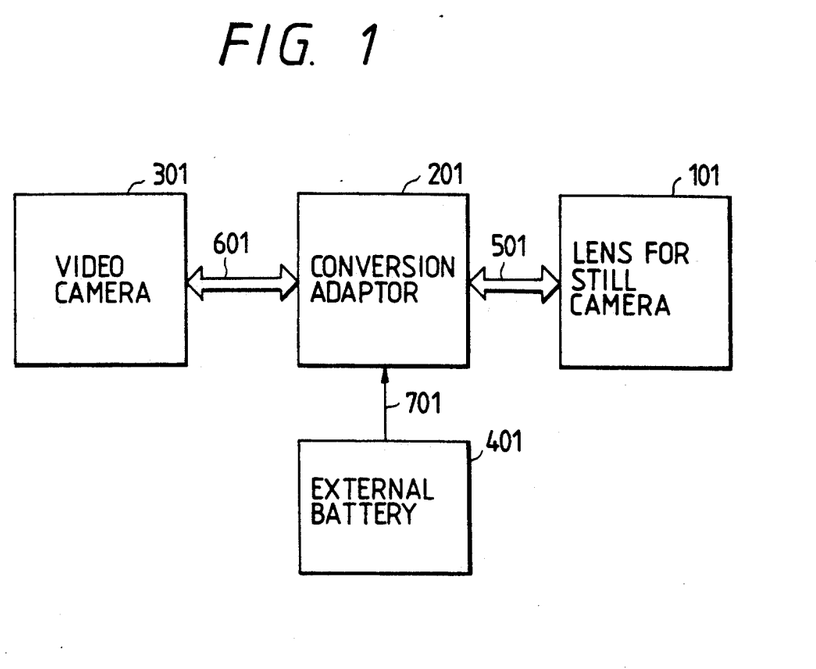
FIG. 1 is a schematic block diagram of an interchangeable lens system of the present invention.

FIG. 1 is a schematic block diagram of the interchangeable lens system of the present invention.

There are shown a video camera body 301 constituting a first control device; an interchangeable lens for a still camera (hereinafter simply called lens) 101 constituting a second control device; a conversion adapter 201 for mounting an interchangeable lens for a single-lens reflex camera on the video camera body 301; and an external battery 401 connected to the conversion adapter 201.

The video camera body 301 and the conversion adapter 201 are mechanically coupled by an unrepresented mount, and are also electrically connected by a bidirectional communication line 601 for sending various control information for controlling the lens 101, from the video camera body to the conversion adapter 201, and also for receiving, from the conversion adapter 201, a status signal indicating the function status of the lens and sent from the lens. Said communication line 601 includes a power supply line for electric power supply from the camera body to the lens, and a ground (GND) line.

Similarly the conversion adapter 201 and the still camera lens 101 are mechanically connected by an unrepresented mount and also electrically connected by a bidirectional communication line 501, whereby the control information from the camera body and the status signal from the lens are exchanged in bidirectional communication through the conversion adapter. Said communication line 501 also includes a power supply line and a ground line.

Figure 2:
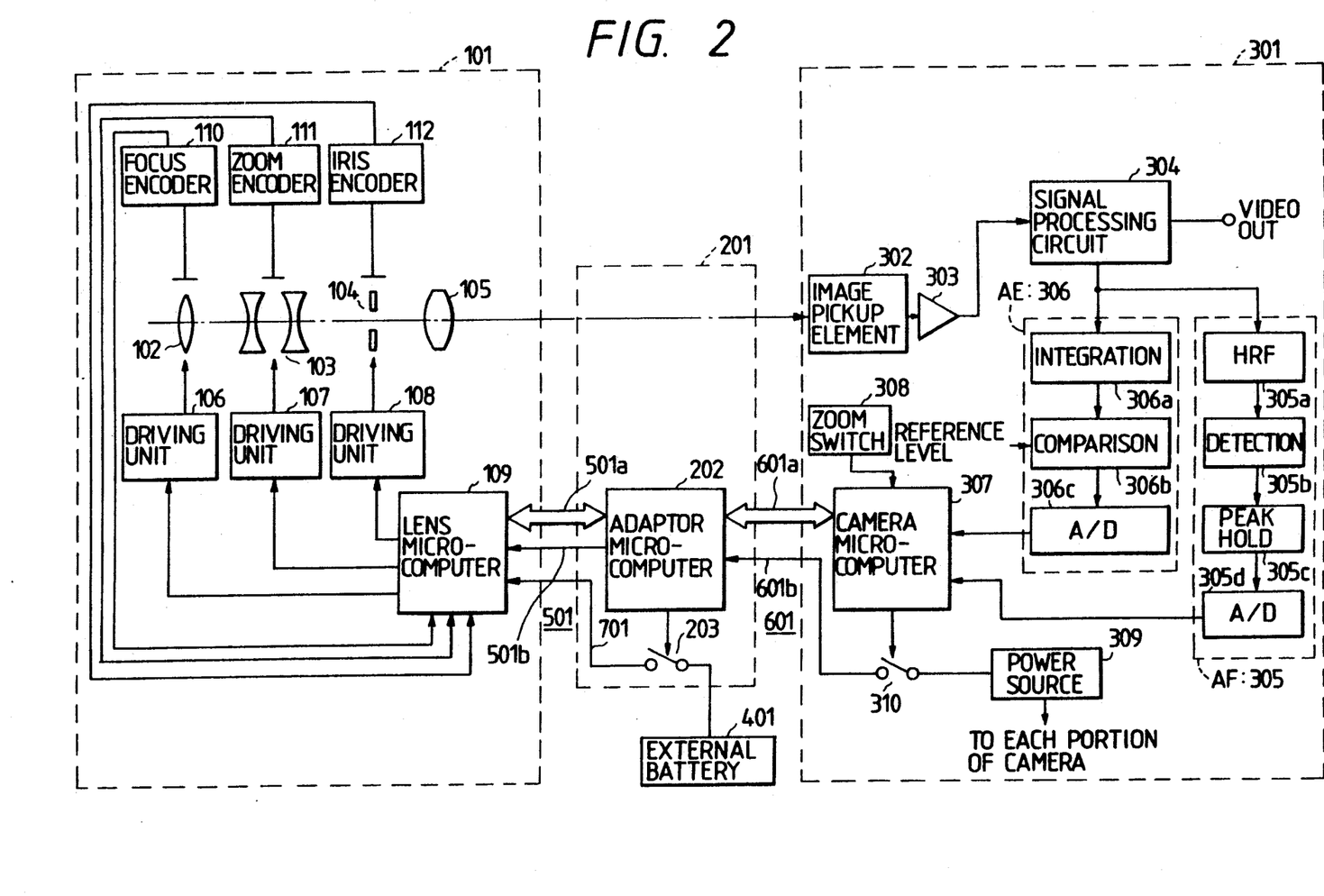
FIG. 2 is a more detailed block diagram of the interchangeable lens system of the present invention.

More specifically, as shown in FIG. 2, the communication lines 501, 601 are composed of data communication lines 501a, 601a for transmitting the control information and the status signals, and power supply and ground lines 501b, 601b for power supply.

Also the conversion adapter 201 and the external battery 401 are connected by a line 701, including a power supply and a ground line.

The power supply connection line 701 may in practice be in common with the power supply line 601b.

FIG. 2 is a more detailed block diagram of the interchangeable lens system of the present invention.

In FIG. 2, same components as those in FIG. 1 are represented by same numbers, but the power supply line and the control signal communication line are illustrated separately for the convenience of explanation.

The lens 101 is provided therein with a group of optical elements such as a focusing lens 102, a zoom lens 103 for effecting zooming by varying the magnification, a diaphragm 104 and a relay lens 105, and driving units 106, 107, 108 consisting of motors and driving circuits for respectively driving the focusing lens, zoom lens and diaphragm. These driving units are controlled by a microcomputer 109 which controls the entire lens, according to the control information sent from the camera body through the conversion adapter 201 and the communication line 501.

Also the function states of the focusing lens, zoom lens and diaphragm are respectively detected by a focus encoder 110, a zoom encoder 111 and a diaphragm encoder 112, then fetched by the microcomputer 109 of the lens for necessary processing, and transmitted through the communication line to the conversion adapter and then to the camera body.

On the other hand, in the video camera body 301, there are provided an image pickup element 302, such as a CCD, for photoelectric conversion of an object image, focused by the lens 101 mounted through the conversion adapter 201, into image signals; a pre-amplifier 303 for amplifying the image signals from the image pickup element 302 to a predetermined level; a signal processing circuit 304 for applying predetermined processing such as gamma correction, blanking, addition of synchronization signals etc. to the output signal of said pre-amplifier 303, thereby obtaining a standard television signal; an auto focusing (AF) circuit 305 for detecting the focus state, based on the high frequency components of a luminance signal extracted from the image signal; an auto exposure (AE) circuit 306 for comparing the average of the luminance signal level of the image signal with a predetermined reference level and releasing a signal for controlling the diaphragm so as that the luminance signal level becomes always equal to the reference level; a microcomputer 307 for controlling all the function of the video camera body (hereinafter called camera microcomputer); and a zoom switch 308 for generating an instruction for operating the zoom lens.

A focus state detection signal from the AF circuit 305, a diaphragm state detection signal from the AE circuit 306, and an operation signal of the zoom switch 308 are supplied to the camera microcomputer 307, then subjected to predetermined processing with reference to the function state signals sent from the lens through the conversion adapter 201, further converted into a format for supply to the lens, and supplied to the conversion adapter 201 through the communication line 601. Then said signals are converted into a control data format for the still camera lens, and transmitted to the lens through the communication line 501 for effecting the lens control.

An electric power source 309, incorporated in the video camera body, is controlled, whether or not to effect electric power supply to the lens or the conversion adaptor at the outside, by an electrical or mechanical switch 310 which is on-off controlled by the microcomputer 307.

In the following there will be briefly explained the functions of the component circuits. The AF circuit 305 extracts the high frequency components, varying according to the focus state, of the luminance signal in the image signal by means of a high-pass filter 305a, converts said high frequency components into a DC level by a detection circuit, then detects the peak value thereof at a predetermined interval by a peak hold circuit 305b, converts said peak value into a digital signal by an A/D converting circuit 305c and sends said digital signal to the microcomputer 307. The microcomputer 307 detects said peak value of the high frequency components at a predetermined interval, calculates the control information for driving the focusing lens so as to maximize said peak value in consideration of the depth of focus by referring to the diaphragm information from the lens, and sends said information to the lens side, namely to the conversion adapter in the present embodiment.

The AE circuit 306 compares light amount information, which is obtained by integrating, in an integrating circuit 306a, the luminance signal component separated for example by a low-pass filter in the signal processing circuit, with a predetermined reference level in a comparator circuit 306b, and sending the difference information to the microcomputer 307 after conversion into a digital signal in an A/D converter circuit 306c, thereby generating a control signal for driving the diaphragm so as to regulate the luminance signal level at said reference level.

Within the lens, the diaphragm driving unit is driven by said control signal, whereby a control loop is formed to regulate the amount of light entering the camera body, thereby eventually reaching an appropriate diaphragm aperture.

Also in the conversion adapter 201, there is provided an adapter microcomputer 202 for controlling the entire adapter and converting the control information, transmitted from the camera body through the communication line 601a, into a data format of the lens side, for supply to the lens through the communication line 501a.

The electric power supplied from the power source 309 of the video camera body through the communication line 601b is further supplied to the lens through the communication line 501b.

Also the adapter microcomputer 202 receives the status information, transmitted from the lens through the communication line 501a, converts said information into a data format matching the camera body, and sends said information to the camera body through the communication line 601a.

A switch 203 for controlling the electric power supply to the lens 101 from the external battery 401 effects on-off control on said external battery 401, connected to the conversion adapter 201, according to the instruction from the adapter microcomputer 202. Said switch 203 is opened when the adapter microcomputer is not in function.

The electric power of said external battery 401 is supplied, through the power supply line 701, to the lens.

Each of the above-mentioned power supply lines is connected not only to the microcomputer of each unit but also to all the control loads in said unit for supplying electric power thereto, but the description will be limited to the connections of power supply lines among the microcomputers, for the purpose of simplicity.

Also the control of control loads in a video camera is quite complex and is often conducted in practice by plural microcomputers, but the description of the present embodiment will be concentrated on the exchange of electrical signals with the conversion adapter and will assume that each of the camera body and the conversion adapter is controlled by a single microcomputer.

In the interchangeable lens system of the present invention explained above, the power supply control operations are conducted in the following manner.

When the video camera body 301 is left along, namely without the lens, it is unnecessary to supply the conversion adapter 201 and the lens 101 with electric power through the communication line 601.

In such situation, as the electrical contacts to which the lens or the conversion adapter is to be connected are exposed to the exterior, the microcomputer 307 of the camera body opens the switch 310, thereby suspending the electric power supply to the exterior.

On the other hand, when the lens or the conversion adapter is connected to the video camera body 301, the microcomputer 307 thereof closes the switch 310, thereby supplying the electric power of the power source 309 of the camera body to the exterior.

When the conversion adapter 201 is connected to the video camera body 301, the electric power supplied from the power source 309 of the camera body 301 to said conversion adapter 201 through the switch 310 and the line 601b is given to the microcomputer 202 of the adapter. (In practice, for stabilizing the voltage supplied to the microcomputer, a voltage regulator is usually provided in said adapter).

The microcomputer 202 of the adapter is activated by said electric power supply.

In case the still camera lens 101 is not mounted on the conversion adapter 201, it is unnecessary to effect electric power supply to the communication line 501, since the camera is unable to function because of absence of the lens.

In such case, since the electrical contacts to which the lens is to be connected are exposed to the exterior, the microcomputer 202 of the adapter opens the switch 203, thereby suspending the electric power supply to the exterior.

On the other hand, when the lens is connected to the conversion adapter 201, the microcomputer 202 thereof closes the switch 203, thereby effecting electric power supply from the external battery 401 to the externally connected lens.

Then, in case the conversion adapter 201 is connected to the still camera lens 101 but not to the video camera body 301, the microcomputer 202 of the adapter is not powered, so that the switch 203 is opened and the electric power is not supplied to the lens. Consequently the electric power of the external battery 401 is not wasted in case the conversion adapter 201, still camera lens 101 and external battery 401 are mutually connected.

This is extremely effective in the interchangeable lens system, as the user tends to forget the on-off operation of the power supply of the lens, once it is removed from the camera body.

In the above-explained embodiment, when a still camera lens of a large electric power consumption is mounted on the video camera body by means of the conversion adapter, said lens can be powered from the power source of said camera body and from the external battery connected to the conversion adapter, through the power supply lines 501b and 701, but it is also possible to dispense with said line 501b and to power said lens only from the external battery of the conversion adapter.

As explained in the foregoing, the interchangeable lens system of the present embodiment is extremely effective, since a lens requiring a large electric power that cannot be directly supplied from the camera body can be powered from an intermediate adapter which has another electric power source, and also since the waste of electric power can be prevented by automatically interrupting the power supply from said another electric power source in case said adapter is detached from the camera body constituting the main control device.

In the foregoing there has been explained an embodiment for resolving the first drawback mentioned before. In the following there will be explained another embodiment for resolving the aforementioned second drawback, with reference to FIG. 3.

Figure 3:
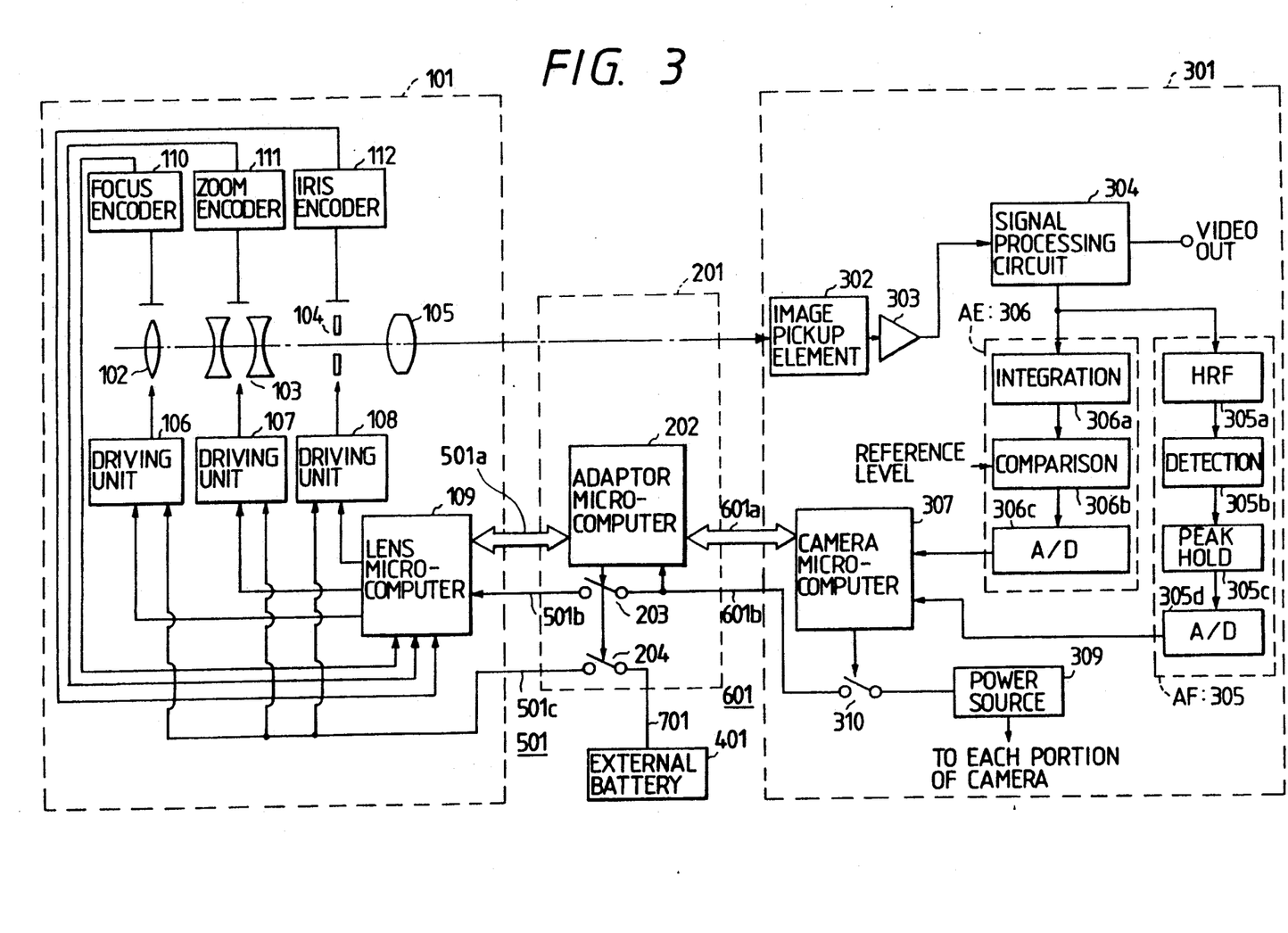
FIG. 3 is a block diagram of another embodiment of the interchangeable lens system of the present invention.

In this embodiment, when a lens unit requiring a large electric power is mounted on the camera body, the driving system requiring a large electric power is powered through an intermediate adapter, while the electric power supply from the camera body is given only to the control system, whereby effective battery control is enabled without the necessity of incorporating a large battery in the camera body.

In FIG. 3, same components as those in the first embodiment shown in FIG. 2 are represented by same numbers and will not be explained further.

As shown in FIG. 3, communication lines 501, 601 are composed of data communication lines 501a, 601a for communication of data such as control information and status information, and power supply lines and ground lines 501b, 501c, 601b, 601c for power supply to the control system. The power supply line 501b serves for power supply from the video camera body to the control system in the lens (lens microcomputer), while the power supply line 501c serves for power supply from an external battery connected to the conversion adapter 201 to various driving systems (focusing lens driving circuit, diaphragm driving circuit, zoom lens driving circuit etc.) in the lens.

The conversion adapter 201 and the external battery 401 are connected by an electrical battery 401 are connected by an electrical signal line 701, which includes a power supply line and a ground line, as in the case of FIG. 2. The electric power, supplied from the power source 309 of the video camera body through the communication line 601b, is further supplied, through the communication line 501b, to the microcomputer 109 constituting the control system of the lens.

Also the adapter microcomputer 202 receives various status information supplied from the lens through the communication line 501a, converts said information into a data format matching the camera body, and sends said information to the camera body through the communication line 601a.

An electrical or mechanical switch 203 on-off controls the electric power for control supplied from the video camera body 301 through the communication line 601b, according to the instruction from the adapter microcomputer 202, thereby controlling the power supply to various driving systems in the still camera lens 101, and is opened when the adapter microcomputer 202 is not in function.

A switch 204 on-off controls the electric power supply line from the external battery 401, connected to the conversion adapter 201, to the various driving systems in the lens, according to the instruction from the adapter microcomputer 202, thereby controlling the power supply from said external battery 401 to said driving systems of the still camera lens 101, and is opened, just like the switch 202, when the adapter microcomputer 202 is not in function.

The electric power of the external battery 401 is supplied, through the power supply line 701, switch 204 and communication line 501c between the conversion adapter and the lens, to the driving systems of the lens.

The adapter microcomputer 202 on-off controls the switches 203, 204 according to the mounting state of the video camera body and the lens, thereby controlling the electric power supply to the control system and the driving systems of the lens.

The control of various loads in a video camera is quite complex and is often conducted in practice by plural microcomputers, but the description of the present embodiment will be concentrated on the exchange of electrical signals with the conversion adapter and will assume that each of the camera body and the conversion adapter is controlled by a single microcomputer.

In the interchangeable lens system of the present embodiment explained above, the power supply control operations are conducted in the following manner.

When the video camera body 301 is left along without the lens, it is unnecessary, as in the foregoing first embodiment, to supply the conversion adapter 201 and the lens 101 with electric power through the communication line 601.

In such situation, as the electrical contacts to which the lens or the conversion adapter is to be connected are exposed to the exterior, the microcomputer 307 of the camera body opens the switch 310, thereby suspending the electric power supply to the exterior.

On the other hand, when the lens or the conversion adapter is connected to the video camera body 301, the microcomputer 307 thereof closes the switch 310, thereby supplying the electric power of the power source 309 of the camera body to the exterior.

When the conversion adapter 201 is connected to the video camera body 301, the electric power supplied from the power source 309 of the camera body 301 to said conversion adapter 201 through the switch 310 and the line 601b is given to the microcomputer 202 of the adapter, thereby activating the same.

In case the still camera lens 101 is not mounted on the conversion adapter 201, it is unnecessary to effect electric power supply to the communication line 501, since the camera is unable to function because of absence of the lens. Also as the electrical contacts to which the lens is to be connected are exposed to the exterior, the microcomputer 202 of the adapter opens the switch 203, thereby suspending the electric power supply to the exterior.

When the lens is connected to the conversion adapter 201, the microcomputer 202 thereof closes the switches 203, 204, thereby supplying the electric power, supplied from the video camera body through the line 601a, to the microcomputer 109 constituting the control system of the lens through the line 501b, and also supplying the electric power, supplied to the conversion adapter 201 from the external battery 401 through the line 701, to the driving systems of the lens through the line 501c.

Then, in case the conversion adapter 201 is connected to the still camera lens 101 but is not connected to the video camera body 301, the switches 203, 204 are both open because the adapter microcomputer 202 is not powered, so that neither of the control and driving systems of the lens is powered. Consequently the electric power of the external battery 401 is not wasted in a state where the conversion adapter 201, still camera lens 101 and external battery 401 are mutually connected.

This is extremely useful in the interchangeable lens system, since the user tends to forget the on-off operation of the power supply of the lens, once the lens is detached from the camera body.

As explained in the foregoing, the interchangeable lens system of the present embodiment is extremely effective particularly when the characteristics of the loads to be controlled vary significantly, since a lens requiring a large electric power that cannot be directly supplied from the camera body can be powered from an intermediate adapter which has another electric power source, and also since efficient electric power supply control can be realized by supplying only the driving system of large electric power consumption with electric power from said another power source and supplying other control system with electric power from the power source incorporated in the camera body.

What is claimed is:

1. An interchangeable lens system comprising:
    a lens unit;
    a camera body provided with first electric power supply means;
    a conversion adapter for connecting said camera body with said lens unit, thereby enabling electric power supply from electric power supply means in said camera body to said lens unit;
    second electric power supply means connected to said conversion adapter and controllable independently from said first electric power supply means in said camera body; and
    control means for enabling electric power supply from said second electric power supply means to said lens unit only when said camera body is connected to said conversion adapter.

2. An interchangeable lens system according to claim 1, wherein said camera body is a video camera.

3. An interchangeable lens system according to claim 2, wherein said lens unit is a lens unit for a still camera.

4. An interchangeable lens system according to claim 3, wherein said control means is incorporated in said conversion adapter.

5. A conversion adapter for connecting a first control device including first electric power supply means with a second control device adapted for receiving electric power supply, thereby enabling electric power supply from said electric power supply means to said control device, wherein second electric power supply means controllable independently from said first control device is rendered connectable to said conversion adapter, and comprising control means for enabling electric power supply from said second electric power supply means to said second control device only when said first control device is connected to said conversion adapter.

6. A conversion adapter according to claim 5, wherein said first control device is a camera body.

7. A conversion adapter according to claim 6, wherein said second control device is a lens unit.

8. A conversion adapter according to claim 5, wherein said control means is a microcomputer provided in said conversion adapter.

9. An interchangeable lens system provided with a lens unit including a driving system and a control system for controlling said driving system, a camera body including first electric power supply means, and a conversion adapter to be connected between said camera body and said lens unit, comprising:
    second electric power supply means connected to said conversion adapter and controllable independently from said first electric power supply means provided in said camera body; and
    electric power source control means so constructed as to supply the control system of said lens unit with electric power from the first electric power supply means in said camera body and to supply the driving system in said lens system with electric power from said second electric power supply means.

10. An interchangeable lens system according to claim 9, wherein said driving systems are motors for driving a focusing lens, a zoom lens, and a diaphragm of said lens unit for varying the optical characteristics thereof.

11. An interchangeable lens system according to claim 9, wherein said camera body is a video camera.

12. An interchangeable lens system according to claim 11, wherein said lens unit is a lens unit for a still camera.

13. An interchangeable lens system according to claim 12, wherein said power supply control means is composed of a microcomputer provided in said conversion adapter.

14. A conversion adapter for connecting a first control device including first electric power supply means with a second control device including a drive system and a control system for controlling said drive system, wherein said conversion adapter is rendered connectable to second electric power supply means controllable independently from said first control device, and said conversion adapter comprises electric power control means for effecting electric power supply control in such a manner as to supply the control system of said second control device with electric power from first electric power supply means in said first control device, and to supply the drive system of said second control device with electric power from said second electric power supply means.

15. A conversion adapter according to claim 14, wherein said first control device is a camera body.

16. A conversion adapter according to claim 15, wherein said second control device is a lens unit.

17. A conversion adapter according to claim 16, wherein said drive system is composed of motors for driving components for varying optical characteristics such as focusing lens, zoom lens and diaphragm.

* * * * *

UNITED STATES PATENT AND TRADEMARK OFFICE
CERTIFICATE OF CORRECTION

PATENT NO.   : 5,257,058                                  Page 1 of 3
DATED        : October 26, 1993
INVENTOR(S)  : Toshiaki Mabuchi It is certified that error appears in the above-indentified patent and that said Letters Patent is hereby corrected as shown below:

| | |
|---|---|
| Col. 1, line 11. | Delete "an" |
| Col. 1, line 22. | Delete "made" |
| Col. 1, line 28. | After "such" insert -- an -- |
| Col. 1, line 32. | Change "spreading of" to -- interest in -- |
| Col. 1, line 37. | After "for" (second occurrence) insert -- a -- |
| Col. 1, line 39. | After "Such" insert -- a -- |
| Col. 1, line 63. | After "in" insert -- a -- |
| Col. 1, line 65. | After "in" insert -- the -- and after "case" insert -- where -- |
| Col. 2, line 9. | After "in" insert -- the -- and after "case" insert -- where -- |
| Col. 2, line 13. | After "such" insert -- a -- |
| Col. 2, line 29. | After "in" insert -- the -- |
| Col. 5, line 1. | Change "etc." to -- etc., -- |
| Col. 5, line 9. | Change "as that" to -- that as -- |
| Col. 5, line 25. | Change "601" to -- 601a -- |
| Col. 5, line 27. | Change "501" to -- 501a -- |
| Col. 6, line 24 and 25. | Change "function" to -- operation -- |
| Col. 6, line 45. | Change "along" to -- alone -- |
| Col. 6, line 48. | Change "601" to -- 601b -- |
| Col. 6, line 49. | After "such" insert -- a -- after "situation" delete -- , -- and after "as" insert -- when -- |
| Col. 7, line 1. | After "In" insert -- the -- and after "case" |

UNITED STATES PATENT AND TRADEMARK OFFICE
CERTIFICATE OF CORRECTION

PATENT NO. : 5,257,058

DATED : October 26, 1993

INVENTOR(S) : Toshiaki Mabuchi

It is certified that error appears in the above-indentified patent and that said Letters Patent is hereby corrected as shown below:

|  |  |
|---|---|
| | insert -- where -- |
| Col. 7, line 4. | After "of" insert -- the -- |
| Col. 7, line 6. | After "such" insert -- a -- |
| Col. 7, line 16. | After "in" insert -- the -- and after "case" insert -- where -- |
| Col. 7, line 22. | After "in" insert -- the -- and after "case" insert -- where -- |
| Col. 7, line 46. | After "in" insert -- the -- and after "case" insert -- where -- |
| Col. 7, line 61. | After "FIG. 3," insert -- the -- |
| Col. 7, line 62. | After "by" insert -- the -- |
| Col. 8, line 8. | After "circuit" insert -- , -- |
| Col. 8, line 10. | After "401" insert -- which -- |
| Col. 8, line 61. | Change "along" to -- alone -- |
| Col. 8, line 66. | After "such" insert -- a -- |
| Col. 9, line 14. | After "In" insert -- the -- and after "case" insert -- where -- |
| Col. 9, line 32. | After "in" insert -- the -- and after "case" insert -- where -- |
| Col. 9, line 40. | After "are" insert -- not -- |

UNITED STATES PATENT AND TRADEMARK OFFICE
CERTIFICATE OF CORRECTION

PATENT NO. : 5,257,058
DATED : October 26, 1993
INVENTOR(S) : Toshiaki Mabuchi

It is certified that error appears in the above-indentified patent and that said Letters Patent is hereby corrected as shown below:

Col. 9, line 56.  After "-ing" insert -- the --

Signed and Sealed this

Tenth Day of May, 1994

Attest:

BRUCE LEHMAN

*Attesting Officer*   *Commissioner of Patents and Trademarks*